(12) United States Patent
Mederer et al.

(10) Patent No.: US 7,114,787 B2
(45) Date of Patent: Oct. 3, 2006

(54) BRAKING SYSTEM FOR TRAILERS OF UTILITY VEHICLES

(75) Inventors: Martin Mederer, Neumarkt (DE); Ansgar Fries, München (DE); Gergely Szabo, Budapest (HU); Matthew Fry, Kingswood (GB)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 10/485,384

(22) PCT Filed: Jul. 26, 2002

(86) PCT No.: PCT/EP02/08371

§ 371 (c)(1),
(2), (4) Date: Aug. 20, 2004

(87) PCT Pub. No.: WO03/011664

PCT Pub. Date: Feb. 13, 2003

(65) Prior Publication Data

US 2005/0001477 A1 Jan. 6, 2005

(30) Foreign Application Priority Data

Jul. 30, 2001 (DE) ............... 101 37 148

(51) Int. Cl.
*B60T 7/20* (2006.01)
(52) U.S. Cl. ............. 303/123; 303/9.66; 303/9.71; 303/7; 303/133

(58) Field of Classification Search ............. 303/3, 303/7, 9.66, 9.69, 9.71, 123, 127, 128, 131, 303/133, 147, 163, 166, 167, 173, 20, 22.1, 303/22.6
See application file for complete search history.

(56) References Cited

U.S. PATENT DOCUMENTS

| | | | | |
|---|---|---|---|---|
| 3,620,577 A * | 11/1971 | Neisch et al. | ............. | 303/123 |
| 3,767,270 A * | 10/1973 | Urban | ............. | 303/123 |
| 3,768,872 A * | 10/1973 | Urban et al. | ............. | 303/123 |
| 5,001,639 A * | 3/1991 | Breen | ............. | 701/70 |
| 5,022,714 A * | 6/1991 | Breen | ............. | 303/7 |
| 5,277,485 A | 1/1994 | Broome | | |
| 5,290,097 A * | 3/1994 | Tsuchiya | ............. | 303/113.2 |
| 6,079,790 A | 6/2000 | Broome | | |
| 6,267,454 B1 * | 7/2001 | Takahashi | ............. | 303/9.71 |
| 6,322,167 B1 * | 11/2001 | Pruhs et al. | ............. | 303/146 |
| 2003/0127910 A1 * | 7/2003 | Frank | ............. | 303/167 |

FOREIGN PATENT DOCUMENTS

| | | |
|---|---|---|
| EP | 0586203 | 3/1994 |
| EP | 0754609 | 1/1997 |

OTHER PUBLICATIONS

International Search Report.

* cited by examiner

*Primary Examiner*—Devon Kramer
(74) *Attorney, Agent, or Firm*—Crowell & Moring LLP

(57) ABSTRACT

The brakes of the front axle of the trailer of a utility vehicle are impinged upon with a brake pressure by way of a single, common ABS valve. Said ABS valve is electrically actuated by an EBS module associated with the rear wheel brakes depending on a differential slip between the front axle and the rear axle.

25 Claims, 2 Drawing Sheets

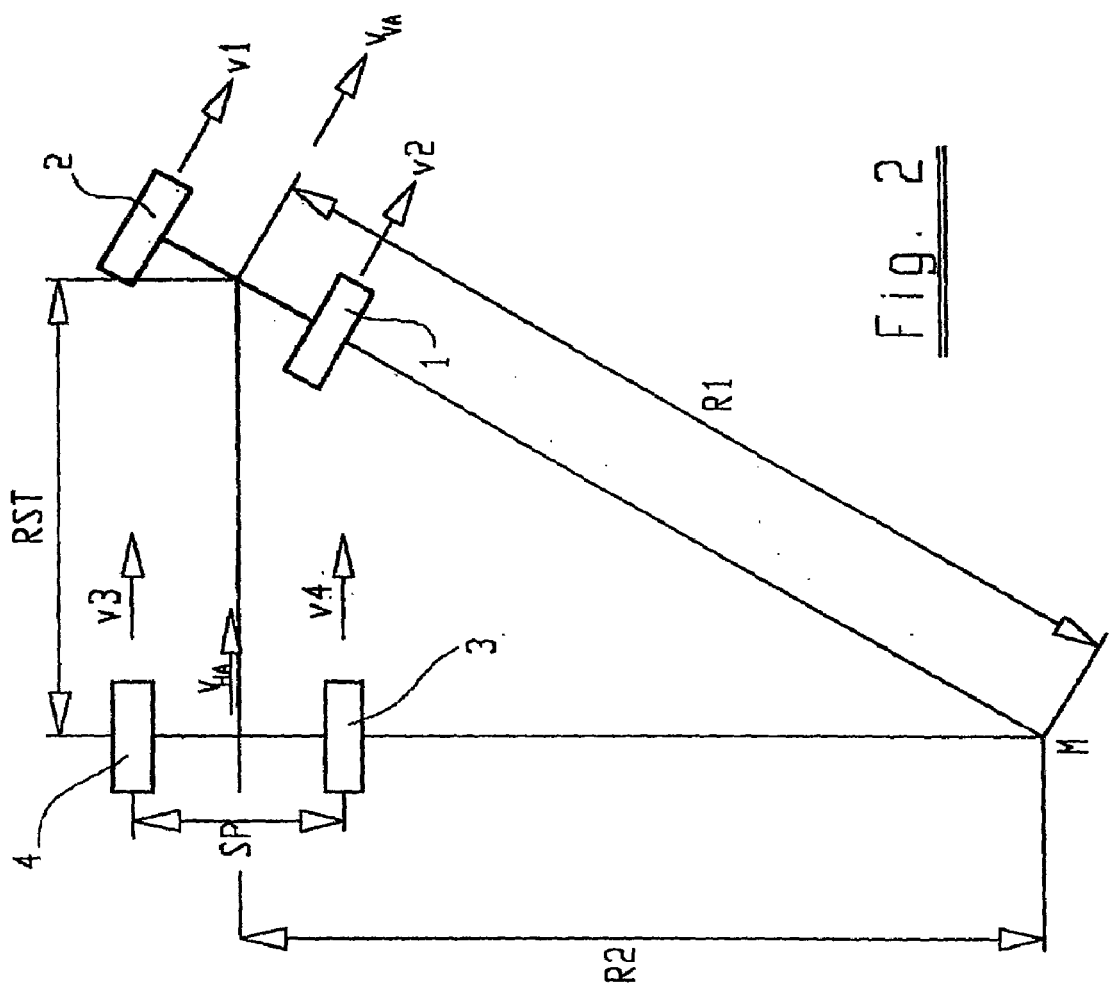

BRAKING SYSTEM FOR TRAILERS OF UTILITY VEHICLES

BACKGROUND AND SUMMARY OF THE INVENTION

The present invention relates to a braking system for trailers of utility vehicles which have a steerable front axle, including front axle brake cylinders, rear axle brake cylinders, rotational wheel speed sensors and an ABS valve.

From German Patent Document DE 38 29 951 C2, a utility vehicle braking system for the load-dependent brake pressure control is known in which a solenoid valve, corresponding to a conventional ABS valve, as well as a rotational wheel speed sensor are assigned to each of the brake cylinders of the four vehicle wheels. The solenoid valves and the rotational wheel speed sensors are connected with a central control unit, which controls the solenoid valves during braking as a function of the axle load distribution. In the case of this system, there is no determination at all of the absolute wheel slips for the axle-load-dependent brake pressure control. On the contrary, for the analysis of the rotational wheel speed signals, the exceeding of a rather rough interaxle "rotational wheel speed difference threshold" is, in each case, used as a criterion for the brake pressure limitation.

From German Patent Document DE 44 43 522 A1, a method is known for determining the incline of a road by which, for a powered driving condition and a free-rolling driving condition, in each case, a rotational wheel speed difference of a powered axle and of a non-powered axle is determined and, from these differences, an incline constant is determined.

From German Patent Document DE 198 09 546 C1, a method for automatically determining the wheel base of steerable vehicles during cornering is known, in which case the wheel base is determined from a defined wheel track and measured wheel circumference speeds.

From the applicant's internal state of the art, an electronic braking system for utility vehicle trailers is known, in which an active pressure control module is, in each case, assigned to the brakes of the front axle and the brakes of the rear axle. These pressure control modules each have three solenoid valves, specifically for ventilating and bleeding, and for a "back-up circuit", as well as a pressure sensor. The controlling of the pressure control module of the front axle takes place by way of the pressure control module of the rear axle, which leads to high wiring expenditures. Specifically, three control lines and one grounding conductor for the solenoid valves, as well as a sensor line and a grounding conductor for the pressure sensor, are required for this purpose.

It is an object of the present invention to provide a braking system for utility vehicle trailers which is cost-effective and requires lower constructional expenditures.

This object is achieved by providing a braking system for utility vehicle trailers which have a steerable front axle, including front axle brake cylinders, rear axle brake cylinders, rotational wheel speed sensors and an ABS valve. The ABS valve is assigned jointly to both brake cylinders and is provided for controlling brake pressure into the front axle brake cylinders. An EBS module is assigned to the rear axle brake cylinders for controlling brake pressure into the rear axle brake cylinders. An electric control output of the EBS module is connected with an electric control input of the ABS valve. The rotational wheel speed sensors are connected to the EBS module for determining a differential slip between the front axle and the rear axle. The EBS module controls the ABS valve as a function of the determined differential slip. Advantageous embodiments and further developments of the invention are contained in the subclaims.

It is the main principle of the invention to control the brakes of the front axle of the utility vehicle trailer by a single joint ABS valve, which is assigned to the two front axle brakes and which is controlled by an electronic braking system, that is, by an EBS module, primarily assigned to the rear axle brakes, specifically as a function of a so-called "differential slip" between the front axle and the rear axle.

More simply stated, the brake pressure control of the rear axle brakes takes place by means of a pressure control module which electrically controls the ABS valve assigned to the two front axle brakes.

The ABS relay valve consists only of two solenoid valves for the holding or bleeding of brake pressure. A pressure sensor for the front axle brakes is not required here. A back-up valve is also not provided. Thus, for connecting the pressure control module with the ABS valve, only three connection lines are required.

Since, according to the invention, no pressure sensor is provided at the front axle, it is true that the pressure control at the front axle brakes cannot be implemented quite as precisely as by means of a pressure sensor. However, the "absence" of a pressure sensor at the front axle can largely be compensated by a so-called "differential slip control algorithm" because the wheel speeds are measured and wheel slips at the wheels of both axles are determined therefrom, which permits the obtaining of "information" concerning the momentary braking power distribution.

The brake pressure control at the front axle therefore takes place as a function of the rotational wheel speed signals supplied by rotational wheel speed sensors and a "differential slip signal" between the front axle and the rear axle derived therefrom.

The object of the control consists of controlling the front axle brake pressure such that the slip occurring during a braking at the front wheels and the rear wheels is identical, or that the difference between a "slip signal" of the front axle and of the rear axle is kept in a defined value range.

In this manner, an approximately uniform deceleration of both axles or a uniform deceleration ratio is ensured. For this purpose, the front axle brake pressure is modulated correspondingly; that is, the brake pressure defined by way of the pneumatic control line is reduced, as required. The reason is that the brake pressure defined by way of the pneumatic control line corresponds to the brake pressure which can be maximally controlled by way of the ABS valve into the front axle brake cylinders.

BRIEF DESCRIPTION OF THE DRAWINGS

In the following, the invention will be explained in detail by means of an embodiment in connection with the drawing.

FIG. 2 is a schematic representation of kinematic relationships of the trailer vehicle during cornering.

DETAILED DESCRIPTION OF THE DRAWINGS

Figure 1:
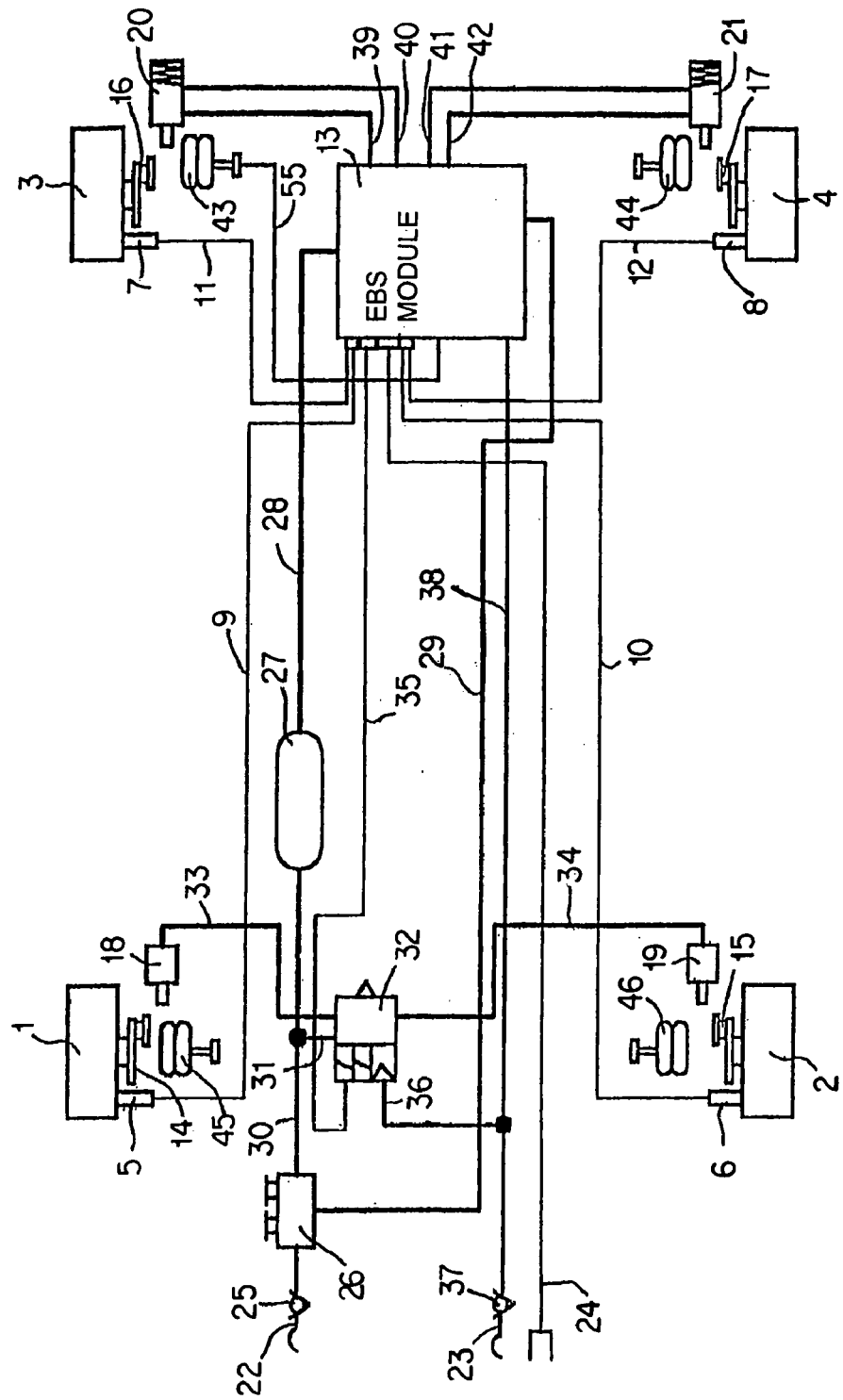
FIG. 1 is a schematic representation of a braking system according to the invention.

The utility vehicle trailer has a steerable front axle with front wheels 1, 2 and a rear axle with rear wheels 3, 4. Rotational wheel speed sensors 5–8 are in each case assigned to the front wheels 1, 2 and the rear wheels 3, 4, and are connected by way of electric lines 9–12 with an electropneumatic brake pressure control module 13 (EBS module) which is primarily assigned to the rear axle brakes. One brake 14–17 is in each case assigned to the front wheels 1, 2 and the rear wheels 3, 4, which brake 14–17 can be applied by means of brake cylinders 18, 19 of the front axle or spring-loaded brake cylinders 20, 21 of the rear axle.

The braking system of the trailer vehicle can be connected by way of three connections, specifically a pneumatic supply line connection 22, a pneumatic control line connection 23 and an electric control connection 24, with the braking system of a traction vehicle.

The supply line connection 22 is connected by way of a return valve 25 and a parking valve 26 with an air brake reservoir 27. From the air brake reservoir 27, a pneumatic line 28 leads to a supply input of the pressure control module 13. In addition, a pneumatic line 29 branches off the parking valve 26 to the pressure control module 13. A pneumatic line 30 extending between the parking valve 26 and the air brake reservoir 27 is connected with a supply input 31 of an ABS valve 32.

The ABS valve 32 is assigned jointly to both brake cylinders 18, 19 of the front axle and is connected with the brake cylinder 18 by way of a pneumatic line 33 and with the brake cylinder 19 by way of a pneumatic line 34. The ABS valve 32 has two electric control inputs which are connected by way of "one" electric line 35 shown here only schematically with the pressure control module 13.

Furthermore, the ABS valve 32 has a pneumatic control input 36 which is connected by way of a return valve 37 with the pneumatic control connection 23. The pneumatic control input 36 is also connected by way of a pneumatic control line 38 with a pneumatic control input of the pressure control module 13. The pressure control module 13 has an integrated pressure sensor (not shown) which measures the pressure in the pneumatic control line 38, that is, the control pressure present at the pneumatic control input 36 of the ABS valve, which control pressure is identical to the maximal pressure which can be controlled into the brake cylinders 18, 19.

The pressure control module 13 has pneumatic outputs 39–42 which are connected by way of assigned pneumatic lines with the spring brake cylinders 20 or 21.

Furthermore, pneumatic axle load sensors or air bellows 43 44 are provided at the rear axle and permit a determination of the axle load, particularly of the dynamic axle load during braking and starting. The axle load sensors 43, 44 are connected by way of electric lines with the pressure control module 13 which is shown here only as an example by means of the electric line 55. Correspondingly axle load sensors 45, 46 may be provided at the front axle which, however, is not absolutely necessary.

During a braking operation, the driver defines a braking demand signal by way of the brake pedal and the pneumatic control line 23 as well as the electric control line 24. Corresponding to the braking demand by the driver, the pressure control module 13 controls brake pressures into the spring brake cylinders 20, 21 as a function of the momentary axle load distribution. By way of the rotational wheel speed sensors 7, 8, the rotational wheel speed behavior of the rear wheels 3, 4 is monitored and, in the event of a locking risk, the rear wheel brake pressure is limited if required.

Simultaneously, the pressure control module 13 controls the ABS valve 32 by way of the electric line 35, specifically as a function of the rear axle brake pressure which is controlled into the spring brake cylinders 20, 21, and the "rotational wheel speed behavior" of the entire vehicle, which is constantly monitored by way of the rotational wheel speed sensors 5–8. From the rotational wheel speed signals supplied by the rotational wheel speed sensors 5–8, the pressure control module 13 determines a "differential slip signal", which supplies information concerning a possibly existing "slip difference" at the wheels 1, 2 and 3, 4, respectively, of the front and rear axle.

During a braking operation, the pressure control module 13 controls the ABS valve 32 such that an approximately identical wheel slip occurs at the front axle and at the rear axle, or that the slip difference between the front and rear axle is within a defined value range.

More simply stated, a front axle brake pressure is controlled into the brake cylinders 18, 19 by the ABS valve 32, specifically as a function of the braking demand defined by the driver as well as of the rear axle load. In a supplementary manner, by way of the axle load sensors 45, 46, the front axle load can be measured and included in the controlling of the ABS valve 32 or in the brake pressure control of the front axle.

The differential slip control according to the invention, essentially consists of the following three main components:
1. Estimation or calculation of the actual brake pressure at the front axle.
2. Determination of the differential slip between the front axle and the rear axle while taking into account a possible cornering.
3. Controlling or regulating of the differential slip.

Estimation of the Front Axle Brake Pressure

It was mentioned above that no pressure sensor is provided at the front axle. The brake pressure at the front axle is therefore not measured precisely but estimated, that is, calculated in an approximate manner.

The control pressure is applied to the ABS valve 32 by way of the pneumatic control input 36. This control pressure is known because it is measured by a pressure sensor (not shown) in the pressure control module 13. The pressure range, in which the estimated output pressure of the ABS valve 32, that is, the brake pressure of the front axle, may be situated, is between zero and the control pressure existing in the lines 36, 38, which is measured in the pressure control module 13.

The actually controlled-in front axle pressure is calculated in an approximate manner by a time-related integration, specifically from the "controlling characteristic" of the ABS valve 32 defined by the pressure control module 13 by way of the electric line 35, that is, the number and time duration of the "opening and closing cycles" of the ABS valve, and the momentarily existing control and supply pressure, the supply pressure being, for example, 8 bar.

The pressure control module therefore supplies the brake cylinders 18, 19 by way of the ABS valve 32 with a "desired" front axle brake pressure. For estimating the pressure, a "variable" is used which specifies the estimation range, in which case "normally" the control pressure defined by way of the pneumatic control line 23, which is equal to the momentary maximally controllable input front-axle brake pressure "P MAX", is used as the range argument. However, when the front axle valve of a 4S3M arrangement (braking system with four sensors and three brake pressure control valves) is considered and the EBS is active and the demanded brake pressure is higher than a threshold value of the pressure control module, the following applies:

The demanded brake pressure is to be used as a range limit for the estimation;

the desired front axle brake pressure is to be used as a "range limit" for the ABS;

the minimum from the desired front axle brake pressure and the desired ABS brake pressure is to be used as the desired pressure for the estimation.

Determination of the Differential Slip

By means of the differential slip calculation, the following data are obtained for processing by a "differential slip controller":

1. A signal indicating that the wheel base—track ratio of the vehicle has been "learned";
2. the momentary "cornering ratio";
3. the diameter-adjusted and cornering-ratio-adjusted differential slip.

The wheel base—track ratio of the utility vehicle trailer with a steerable front axle can be "learned" or calculated from the wheel speeds if certain conditions are met. The signal indicating that the wheel base—track ratio was learned will be generated when the wheel base—track ratio has been learned at least once since being switched-on (power on).

The wheel base—track ratio can be stored in an EEPROM. In this case, the above-mentioned signal will be generated when the wheel base—track ratio has been learned at least once since the installation of the EBS system of the trailer vehicle. The signal is to be canceled only when a wheel base—track ratio has been learned which differs significantly from the value stored in the EEPROM. This may indicate that the EBS module of the trailer vehicle was installed in another vehicle.

When the signal is generated, the "slip controller" is to rely on the cornering-compensated differential slip value even during narrow cornering.

The signal is to be set during an ABS intervention and additionally 0.5 s afterwards.

Cornering Ratio

The cornering ratio supplies information on how narrowly the vehicle is cornering at the time. Here, the cornering ratio is the amount-related ratio of the difference between the two rear wheel speeds of the vehicle and the "mean" rear wheel speed. It is indicated in percent and is a non-negative value (amount). The reason is that the cornering ratio does not have to supply information on whether the vehicle is just cornering in the left or the right direction.

Differential Slip

The differential slip is "wheel-diameter-compensated and cornering-compensated". This means that, during the monitoring of whether a "slip difference" exists between the front axle and the rear axle, the wheel diameters of the vehicle and the cornering ratio have to be taken into account, particularly whether the vehicle is momentarily cornering or is driving straight ahead. The reason is that, in the case of a trailer vehicle with a steerable front axle, during a cornering, the front wheel speeds are per se greater than the speeds of the rear wheels. The slip difference can therefore not be determined by a "simple" wheel speed difference formation between the front axle and the rear axle. If, during the determination of the differential slip, the momentary cornering ratio were not taken into account, thus, no differentiation were made between a cornering and a straight-ahead drive, errors would necessarily occur.

The kinematic relationships in the case of a trailer vehicle with a steerable front axle will be explained in detail in connection with FIG. 2. In this case, the following variables will be used:

| | |
|---|---|
| Speeds of the front wheels | v1, v2 |
| speeds of the rear wheels | v3, v4 |
| mean front axle speed | $v_{VA}$ |
| mean rear axle speed | $v_{HA}$ |
| speed difference of rear wheels | $\Delta v_{HA}$ |
| reference speed of front axle | $v_{VA,Ref}$ |
| wheel base | RST |
| track | SP |
| wheel base - track ratio | $\Phi$ |
| yaw rate of trailer vehicle | $d\Omega/dt$ |
| mean cornering radius of front axle relative to the instantaneous center of rotation M | R1 |
| mean cornering radius of rear axle relative to the instantaneous center of rotation M | R2 |

FIG. 2 is a schematic view of a trailer vehicle with a steerable front axle with front wheels 1, 2 and rear wheels 3, 4 during a cornering. By means of the rotational wheel speed sensors 5, 6 illustrated in FIG. 1, the wheel circumference speeds v1, v2 of the front wheels 1, 2 are measured. Correspondingly, the rotational wheel speed sensors 7, 8 measure the rotational wheel speeds, or the wheel circumference speeds v3, v4 of the rear wheels 3, 4 are measured while taking into account the wheel diameters. From the wheel circumference speeds v1, v2, a "mean" front axle speed $v_{VA}$ can be determined:

$$v_{VA} = \frac{v1 + v2}{2}$$

Correspondingly, a mean rear axle speed $v_{HA}$ is determined:

$$v_{HA} = \frac{v3 + v4}{2}$$

The differential slip $\Delta s$ between the front axle and the rear axle can be defined as follows:

$$\Delta s = \frac{v_{VA} - v_{HA}}{v_{HA}} \ [0.1\ \%]$$

Determination of the Wheel Base—Track Ratio

By using the Pythagorean theorem, the wheel base can be calculated from the mean front axle speed and the mean rear axle speed.

The wheel base of the trailer vehicle is therefore:

$$RST = \sqrt{R1^2 - R2^2}$$

When the two mean cornering radii are each multiplied by the yaw rate of the vehicle, the "tangential speeds" are obtained at the axle center points, that is, the mean front axle speed $v_{VA}$ and the mean rear axle speed $v_{HA}$:

$$v_{HA} = d\Omega/dt \approx R1;$$

$$v_{HA} = d\Omega/dt \approx R2.$$

The differential speed at the rear axle, that is, the speed difference between the right rear axle wheel 3 and the left rear axle wheel 4 is:

$$\Delta v_{HA} = d\Omega/dt \cdot SP.$$

The wheel base—track ratio Φ can be calculated as follows:

$$\phi = \frac{RST}{SP} = \frac{\sqrt{R1^2 - R2^2}}{SP}$$

When a multiplication takes place by means of dΩ/dt, the following is obtained:

$$\phi = \frac{\sqrt{\left(\frac{d\Omega}{dt} \cdot R1\right)^2 - \left(\frac{d\Omega}{dt} \cdot R2\right)^2}}{\frac{d\Omega}{dt} \cdot SP} = \frac{\sqrt{v_{VA}^2 - v_{HA}^2}}{\Delta v_{HA}}$$

The wheel base—track ratio can therefore be calculated from the wheel speeds.

However, this equation applies only if the following marginal conditions have been met:
a) No longitudinal slip at the wheels or no braking;
b) no lateral slip at the wheels, that is, no significant lateral acceleration;
c) the wheel speeds are corrected by a wheel diameter calibration;
d) the wheel speed values are not too low for achieving a sufficient accuracy;
e) a significant cornering ratio exists for a sufficient accuracy.

The lateral acceleration can be determined from the speeds and the cornering ratio. The learning operation for the wheel base—track ratio should be based on an average measuring duration of one second, during which the above-mentioned conditions are continuously met.

When the learning operation has been implemented at least once after being switched-on (power on), the signal should be set which indicates the learning operation. Until then, a defined value (default value) should be used for the wheel base—track ratio. For example, Φ=2.5 may be defined as an "initial value" for the wheel base—track ratio.

Calculation of the Differential Slip Between the Front Axle and the Rear Axle

The calculation may be based on the above-mentioned formula $$\Delta s = \frac{v_{VA} - v_{HA}}{v_{HA}}$$

In this formula, the mean rear axle speed $v_{HA}$ is the reference speed (denominator).

Instead of the mean rear axle speed $v_{HA}$, however, a "front axle reference speed" should be used in the denominator in practice, which front axle reference speed is calculated from the mean rear axle speed $v_{HA}$, the cornering ratio and the wheel base—track ratio.

FIG. 2 indicates that, when the Pythagorean theorem is used, the front axle reference $v_{VA,Ref}$ can be calculated as follows:

$$v_{VA,Ref} = \sqrt{v_{HA}^2 + (d\Omega/dt \cdot RST)^2}$$

$$v_{VA,Ref} = \sqrt{v_{HA}^2 + (d\Omega/dt \cdot SP \cdot \phi)^2}$$

With $\Delta v_{HA} = d\Omega/dt \cdot SP$, the following is obtained:

$$v_{VA,Ref} = \sqrt{v_{HA}^2 + (\Delta v_{HA} \cdot \phi)^2}$$

Thus, the formula for calculating the differential slip Δs is as follows:

$$\Delta s = \frac{v_{VA} - v_{VA,Ref}}{v_{VA,Ref}} = \frac{v_{VA}}{V_{VA,Ref}} - 1 \; [0.1\%]$$

The differential slip value should always be filtered, the time constant being, for example, 0.25 s. In the event of an ABS intervention, however, no filtering should take place because excessively high differential slip values during an ABS intervention would influence the values after the ABS intervention.

Slip Controller

The following quantities are fed to the slip controller as input quantities:
  Compensated differential slip ([0.1%]);
  cornering ratio [%];
  signal indicating that the wheel base—track ratio has been learned.

The differential slip controller supplies a desired front axle pressure $p_{VA}$ as an output signal, or a control signal corresponding to this desired front axle pressure for the ABS valve of the front axle.

The slip controller is a pure integral controller (I controller). The feedback signal for the slip controller is the compensated differential slip Δs [0.1%].

The control signal or the control variable of the controller is the ratio between the front axle brake pressure and the trailer brake pressure; that is, the rear axle brake pressure demanded by the driver in [0.1%].

$$\text{Control signal} = \frac{p_{VA}}{p_{HA}} \; [0.1\%]$$

A control signal of 1,000 means that the front axle brake pressure $p_{VA}$ and the rear axle brake pressure $p_{HA}$ are the same.

The amplification of the I term, which is the control signal itself, should be $$\frac{30 \; \%/s}{\%}$$

This means that, in the case of a differential slip of +1%, the control signal, that is, the relationship between the desired front axle brake pressure $p_{VA}$ and the desired rear axle brake pressure $p_{HA}$ has a rise rate of 30%/s.

The controller should have a tolerance band of 1%. This means that, if the differential slip is in the interval [−1%, +1%], which corresponds to differential slip values of −10 . . . +10, the amplification should be canceled, that is, the control signal should not be changed.

Initialization of the Controller

After an operation of the EBS system, the control signal (I term) should be initialized, specifically at a defined ratio of 1:1, which corresponds to a "starting value" of 1,000.

However, this starting value can be adapted during several brake applications. The optimal braking power distribution depends on the geometrical dimensions of the trailer and on the horizontal and vertical position of the center of gravity, which is a function of the load. None of these characteristics changes rapidly from one moment to the next. It is therefore assumed that the load condition can change exclusively between a switched-off condition and a switched-on condition or when the vehicle is stopped in the switched-on condition, if this condition does not last longer than 5 minutes.

A storage variable for storing the initialization value of the control signal should be provided. The default value after a "reset" should be 1,000. It should be overwritten by the control signal when the following conditions are met:

a) The wheel speeds are modified by a wheel diameter calibration;
b) the wheel diameter calibration has been terminated at least once since the switching-on;
c) the EBS and the slip control are active;
d) no ABS intervention has taken place during the momentary brake application;
e) the differential slip was constantly between −1% . . . +1% during the last 0.5 s;
f) the cornering ratio is lower than 3%.

The initialization value should be reset to the default value of 1,000 after a 5-minute vehicle stoppage.

Safety Level

The braking system monitors whether the required conditions exist for a complete operation. The following are necessary conditions:

Four rotational wheel speed signals exist;
the control pressure signal is present;
the control of the rear axle brake pressure is available.
The following safety levels are required:
Complete functioning when everything is available;
uniform braking power distribution; that is, no slip control when a disturbance is present during the wheel sensing;
control pressure is controlled through to the outputs when a disturbance is present in the rear axle brake pressure control; in this case, a pressure control takes place at none of the axles.

a) Control Off

When a disturbance occurs in the EBS system, the ABS valve controls the maximal value defined by way of the control pressure line into the front axle brake cylinders.

b) 1:1 Control

In the case of a disturbance of a rotational wheel speed sensor or when a rotational wheel speed sensor does not operate reliably, a "switch-over" takes place to a "default" condition when the EBS system is not active. In this case, the output signal, that is, the front axle brake pressure $p_{VA}$ is identical with the rear axle brake pressure $p_{HA}$.

c) Control Active

The front axle brake pressure $p_{VA}$ should be:

$$p_{VA} = p_{HA} \cong \frac{\text{control signal}}{1000}$$

The control signal should be calculated in each cycle. In the case of an EBS intervention, the "default condition" should be taken up (only in the case of a 4S3M arrangement).

d) Control Frozen

This condition corresponds essentially to the active condition, but the control signal is not changed. The braking power distribution is therefore "frozen".

A transition takes place from the "active condition" to the "frozen" condition if one of the following conditions is met:
No ABS flag clear (ABS activity and the following 5 s failed);
cornering ratio>lower limit (when the wheel base—track ratio was not learned);
cornering ratio>upper limit (when the wheel base—track ratio was learned).

The invention claimed is:

1. Braking system for a utility vehicle trailer having a steerable front axle, the system comprising:
front axle brake cylinders, rear axle brake cylinders, and rotational wheel speed sensors;
an ABS valve assigned jointly to both front axle brake cylinders for controlling brake pressure into the front axle brake cylinders;
an EBS module assigned to the rear axle brake cylinders for controlling brake pressure into the rear axle brake cylinders;
an electric control output of the EBS module coupled with an electric control input of the ABS valve;
wherein the rotational wheel speed sensors are connected to the EBS module for determining a differential slip ($\Delta s$) between the steerable front axle and a rear axle of the trailer;
wherein the EBS module controls the ABS valve as a function of the determined differential slip ($\Delta s$); and
wherein the differential slip ($\Delta s$) is determined from a mean front axle speed ($v_{VA}$) and a front axle reference speed ($v_{VA,Ref}$), according to the formula:

$$\Delta s = \frac{v_{VA} - v_{VA,Ref}}{v_{VA,Ref}} = \frac{v_{VA}}{v_{VA,Ref}} - 1.$$

2. Braking system according to claim 1, wherein for controlling the ABS valve, the EBS module determines a desired front axle brake pressure ($p_{VA}$) as a function of a control pressure defined by a driver, the control pressure being defined by the driver by way of a pneumatic control line, or a momentarily controlled-in rear axle brake pressure ($p_{VA}$) and a momentary differential slip ($\Delta_{VA}$).

3. Braking system according to claim 2, wherein the ABS valve or the desired front axle brake pressure ($p_{VA}$) are controlled such that the same slip occurs at the steerable front axle and at the rear axle or that the differential slip ($\Delta s$) is held in a defined permissible value range.

4. Braking system according to claim 1, wherein the front axle reference speed ($V_{VA,Ref}$) is determined from a mean rear axle speed ($v_{HA}$), a speed difference between rear wheels on the rear axle ($\Delta v_{HA}$) and a wheel base—track ratio ($\Phi$) of the trailer vehicle according to the formula:

$$v_{VA,Ref} = \sqrt{v_{HA}^2 + \Delta v_{HA} \cdot \Phi)^2},$$

5. Braking system according to claim 4, wherein the wheel base—track ratio ($\Phi$) of the trailer is determined from the mean front axle speed ($v_{VA}$), the mean rear axle speed ($v_{HA}$), and the speed difference of the rear wheels ($\Delta v_{HA}$) according to the formula:

$$\phi = \frac{\sqrt{v_{VA}^2 - v_{HA}^2}}{\Delta v_{HA}}.$$

6. Braking system according to claim 5, wherein an initial value of Ø=2.5 is defined for the wheel base—track ratio (Φ) of the trailer.

7. Braking system according to claim 2, wherein the ABS valve has a control input coupled with a pneumatic control line, and further wherein, in the case of a disturbance of the EBS module, the ABS valve controls a brake pressure defined by the driver by way of the pneumatic control line into the front axle brake cylinders.

8. Braking system according to claim 2, wherein in the case of a disturbance of one or more of the rotational wheel speed sensors, the ABS valve is controlled such that the front axle brake pressure ($p_{VA}$) is identical with the rear axle brake pressure ($p_{VA}$) controlled in by the EBS module.

9. Braking system for a utility vehicle trailer having a steerable front axle, the system comprising:
front axle brake cylinders, rear axle brake cylinders, and rotational wheel speed sensors;
an ABS valve assigned jointly to both front axle brake cylinders for controlling brake pressure into the front axle brake cylinders;
an EBS module assigned to the rear axle brake cylinders for controlling brake pressure into the rear axle brake cylinders;
an electric control output of the EBS module coupled with an electric control input of the ABS valve;
wherein the rotational wheel speed sensors are connected to the EBS module for determining a differential slip ($\Delta s$) between the steerable front axle and a rear axle of the trailer;
wherein the EBS module controls the ABS valve as a function of the determined differential slip ($\Delta s$); and
wherein the ABS valve has a control input coupled with a pneumatic control line, and further wherein, in the case of a disturbance of the EBS module, the ABS valve controls a brake pressure defined by a driver by way of the pneumatic control line into the front axle brake cylinders.

10. Braking system according to claim 9, wherein the ABS valve or a desired front axle brake pressure ($p_{VA}$) are controlled such that the same slip occurs at the steerable front axle and at the rear axle or that the differential slip ($\Delta s$) is held in a defined permissible value range.

11. Braking system according to claim 9, wherein the differential slip ($\Delta s$) is determined from a mean front axle speed ($v_{VA}$) and a front axle reference speed ($v_{VA,Ref}$), according to the formula:

$$\Delta s = \frac{v_{VA} - v_{VA,Ref}}{v_{VA,Ref}} = \frac{v_{VA}}{v_{VA,Ref}} - 1.$$

12. Braking system according to claim 11, wherein the front axle reference speed ($v_{VA,Ref}$) is determined from a mean rear axle speed ($v_{HA}$), a speed difference between rear wheels on the rear axle ($\Delta v_{HA}$) and a wheel base—track ratio (Φ) of the trailer vehicle according to the formula:

$$v_{VA,Ref} = \sqrt{v_{HA}^2 + \Delta v_{HA} \cdot \phi)^2},$$

13. Braking system according to claim 12, wherein the wheel base—track ratio (Φ) of the trailer is determined from the mean front axle speed ($v_{VA}$), the mean rear axle speed ($v_{HA}$), and the speed difference of the rear wheels ($\Delta v_{HA}$) according to the formula:

$$\phi = \frac{\sqrt{v_{VA}^2 - v_{HA}^2}}{\Delta v_{HA}}.$$

14. Braking system according to claim 13, wherein an initial value of Ø=2.5 is defined for the wheel base—track ratio (Φ) of the trailer.

15. Braking system for a utility vehicle trailer having a steerable front axle, the system comprising:
front axle brake cylinders, rear axle brake cylinders, and rotational wheel speed sensors;
an ABS valve assigned jointly to both front axle brake cylinders for controlling brake pressure into the front axle brake cylinders;
an EBS module assigned to the rear axle brake cylinders for controlling brake pressure into the rear axle brake cylinders;
an electric control output of the EBS module coupled with an electric control input of the ABS valve;
wherein the rotational wheel speed sensors are connected to the EBS module for determining a differential slip ($\Delta s$) between the steerable front axle and a rear axle of the trailer;
wherein the EBS module controls the ABS valve as a function of the determined differential slip ($\Delta s$); and
wherein in the case of a disturbance of one or more of the rotational wheel speed sensors, the ABS valve is controlled such that a front axle brake pressure ($p_{VA}$) is identical with the rear axle brake pressure ($p_{VA}$) controlled in by the EBS module.

16. Braking system according to claim 15, wherein the differential slip ($\Delta s$) is determined from a mean front axle speed ($v_{VA}$) and a front axle reference speed ($v_{VA,Ref}$), according to the formula:

$$\Delta s = \frac{v_{VA} - v_{VA,Ref}}{v_{VA,Ref}} = \frac{v_{VA}}{v_{VA,Ref}} - 1.$$

17. Braking system according to claim 16, wherein the front axle reference speed ($v_{VA,Ref}$) is determined from a mean rear axle speed ($v_{HA}$), a speed difference between rear wheels on the rear axle rear wheels ($\Delta v_{HA}$) and a wheel base—track ratio (Φ) of the trailer vehicle according to the formula:

$$v_{VA,Ref} = \sqrt{v_{HA}^2 + \Delta v_{HA} \cdot \phi)^2},$$

18. Braking system according to claim 17, wherein the wheel base—track ratio (Φ) of the trailer is determined from the mean front axle speed ($v_{VA}$), the mean rear axle speed ($v_{HA}$), and the speed difference of the rear wheels ($\Delta v_{HA}$) according to the formula:

$$\phi = \frac{\sqrt{v_{VA}^2 - v_{HA}^2}}{\Delta v_{HA}}.$$

19. Braking system according to claim 18, wherein an initial value of $\varnothing=2.5$ is defined for the wheel base—track ratio ($\Phi$) of the trailer.

20. A braking method for a utility vehicle trailer having a steerable front axle, the braking method comprising the acts of:
controlling brake pressures into front axle brake cylinders via a single joint ABS valve;
controlling brake pressures into rear axle brake cylinders via an EBS module, said EBS module being electrically coupled with the ABS valve;
determining a differential slip value between the steerable front axle and a rear axle via the EBS module;
controlling the ABS valve via the EBS module as a function of the determined differential slip value; and
wherein for controlling the ABS valve, the EBS module determines a desired front axle brake pressure ($p_{VA}$) as a function of a control pressure defined by a driver, the control pressure being defined by the driver by way of a pneumatic control line, or a momentarily controlled-in rear axle brake pressure ($p_{VA}$) and a momentary differential slip ($\Delta_{VA}$).

21. Braking method according to claim 20, wherein the ABS valve or the desired front axle brake pressure ($p_{VA}$) are controlled such that the same slip occurs at the front axle and at the rear axle or that the differential slip ($\Delta s$) is held in a defined permissible value range.

22. A braking method for a utility vehicle trailer having a steerable front axle, the braking method comprising the acts of:
controlling brake pressures into front axle brake cylinders via a single joint ABS valve;
controlling brake pressures into rear axle brake cylinders via an EBS module, said EBS module being electrically coupled with the ABS valve;
determining a differential slip value between the steerable front axle and a rear axle via the EBS module;
controlling the ABS valve via the EBS module as a function of the determined differential slip value; and
wherein the differential slip ($\Delta s$) is determined from a mean front axle speed ($v_{VA}$) and a front axle reference speed ($v_{VA,Ref}$), according to the formula:

$$\Delta s = \frac{v_{VA} - v_{VA,Ref}}{v_{VA,Ref}} = \frac{v_{VA}}{v_{VA,Ref}} - 1.$$

23. Braking method according to claim 22, wherein the front axle reference speed ($v_{VA,Ref}$) is determined from a mean rear axle speed ($v_{HA}$), a speed difference between rear wheels on the rear axle ($\Delta v_{HA}$) and a wheel base—track ratio ($\Phi$) of the trailer vehicle according to the formula:

$$v_{VA,Ref} = \sqrt{v_{HA}^2 + \Delta v_{HA} \cdot \phi)^2},$$

24. Braking method according to claim 23, wherein the wheel base—track ratio ($\Phi$) of the trailer is determined from the mean front axle speed ($v_{VA}$), the mean rear axle speed ($v_{HA}$), and the speed difference of the rear wheels ($\Delta v_{HA}$) according to the formula:

$$\phi = \frac{\sqrt{v_{VA}^2 - v_{HA}^2}}{\Delta v_{HA}}.$$

25. Braking method according to claim 24, wherein an initial value of $\varnothing=2.5$ is defined for the wheel base—track ratio ($\Phi$) of the trailer.

* * * * *